(12) United States Patent
Lui

(10) Patent No.: US 7,293,944 B2
(45) Date of Patent: Nov. 13, 2007

(54) POWER TOOL WITH TOOL BIT HOLDER OPERATOR

(75) Inventor: Tat Nin Lui, Hong Kong (HK)

(73) Assignee: Choon Nang Electrical Appliance Mfy., Ltd., Aberdeen, Hong Kong (CN)

( * ) Notice: Subject to any disclaimer, the term of this patent is extended or adjusted under 35 U.S.C. 154(b) by 0 days.

(21) Appl. No.: 11/168,482

(22) Filed: Jun. 29, 2005

(65) Prior Publication Data

US 2006/0018727 A1   Jan. 26, 2006

(30) Foreign Application Priority Data

Jul. 20, 2004   (HK) ............................... 04105288.6

(51) Int. Cl.
*B23C 1/20* (2006.01)

(52) U.S. Cl. .................. 409/182; 409/232; 279/42; 279/147; 279/150

(58) Field of Classification Search ................ 409/182, 409/181, 175, 232, 234; 408/240; 279/42, 279/48, 56, 147, 149–150; 144/154.5, 136.95
See application file for complete search history.

(56) References Cited

U.S. PATENT DOCUMENTS

| | | | |
|---|---|---|---|
| 4,162,080 A * | 7/1979 | Buck ............................ | 279/48 |
| 4,386,879 A * | 6/1983 | Martinmaas ............ | 408/241 R |
| 5,167,478 A | 12/1992 | Ramunas | |
| 5,810,366 A * | 9/1998 | Montjoy et al. .............. | 279/43 |
| 6,042,310 A * | 3/2000 | Campbell et al. ........... | 409/131 |
| 6,056,298 A * | 5/2000 | Williams ..................... | 279/150 |
| 6,079,916 A * | 6/2000 | Grayson et al. ............ | 409/182 |
| 6,179,512 B1 * | 1/2001 | Gibson et al. ........... | 403/374.1 |
| 6,224,304 B1 * | 5/2001 | Smith et al. ................ | 409/182 |
| 6,350,087 B1 * | 2/2002 | Berry et al. ................ | 409/131 |
| 6,648,567 B2 * | 11/2003 | Berry et al. ................ | 409/182 |
| 6,913,429 B1 * | 7/2005 | Phillips et al. .............. | 409/182 |
| 6,932,357 B2 * | 8/2005 | Jacobs et al. ................ | 279/42 |
| 2006/0105687 A1 * | 5/2006 | Lui et al. ..................... | 451/359 |

\* cited by examiner

*Primary Examiner*—Erica Cadugan
(74) *Attorney, Agent, or Firm*—Leydig, Voit & Mayer, Ltd.

(57) ABSTRACT

A power tool having a body, a tool bit holder protruding from the tool body for holding and rotating a tool bit about an axis of rotation, and an operator for operating the bit holder. The operator includes an annular member rotationally engageable with the bit holder for manual turning to tighten and/or release the bit holder, and a mount mounting the annular member to the tool body for movement between a non-operative position, rotationally disengaged from the bit holder, and an operative position, rotationally engaged with the bit holder.

20 Claims, 3 Drawing Sheets

POWER TOOL WITH TOOL BIT HOLDER OPERATOR

The present invention relates to a power tool, and particularly but not exclusively to a power hand tool, having a tool bit holder with an operator therefor.

BACKGROUND OF THE INVENTION

Most power tools incorporate a tool bit holder, such as a chuck or collet, which can be loosened (and re-tightened) for replacing or changing a tool bit. This often requires the use of an operator such as a key or spanner-like device, but invariably it comes as an accessory item that is prone to loss or at least must first be fetched and then carefully mounted for use.

The invention seeks to mitigate or to at least alleviate such a shortcoming by providing a power tool incorporating an improved tool bit holder operating device.

SUMMARY OF THE INVENTION

According to the invention, there is provided a power tool having a body, a tool bit holder protruding from the tool body for holding and rotating a tool bit about an axis of rotation, and an operator for operating the bit holder. The operator comprises an annular member rotationally engageable with the bit holder for manual turning to tighten and/or loosen the bit holder, and a mount mounting the annular member to the tool body for movement between a non-operative position rotationally disengaged from the bit holder and an operative position rotationally engaged with the bit holder.

Preferably, the operator includes resilient means acting upon the annular member to resiliently bias the annular member towards the non-operative position.

Preferably, the mount mounts the annular member to the tool body at a position surrounding the bit holder for movement in opposite directions along the axis of rotation between the non-operative position and the operative position.

It is preferred that the annular member has an aperture of a non-circular cross-section complementary to that of the bit holder for rotational engagement therewith.

Preferably, the annular member includes a rigid component for rotational engagement with the bit holder.

More preferably, the rigid component is an insert of the annular member, with the annular member moulded thereon by an insert moulding process.

It is further preferred that the rigid component has at least one arm fixed with the annular member.

In a preferred embodiment, the mount extends through the annular member and is then connected to the tool body, whereby the annular member is slidable along the mount between the non-operative position and the operative position.

More preferably, the tool body has a circular element, and the mount has a plurality of legs that extend through the annular member and are then rotatably engaged with the tool body element through a snap action.

Preferably, the tool body has a circular element, and the mount is rotatably engaged with the tool body element to permit manual turning of the annular member.

It is preferred that the resilient means is held within the mount and acts between the mount and the annular member to resiliently bias the annular member towards the non-operative position.

In a preferred embodiment, the tool bit holder comprises a collet.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
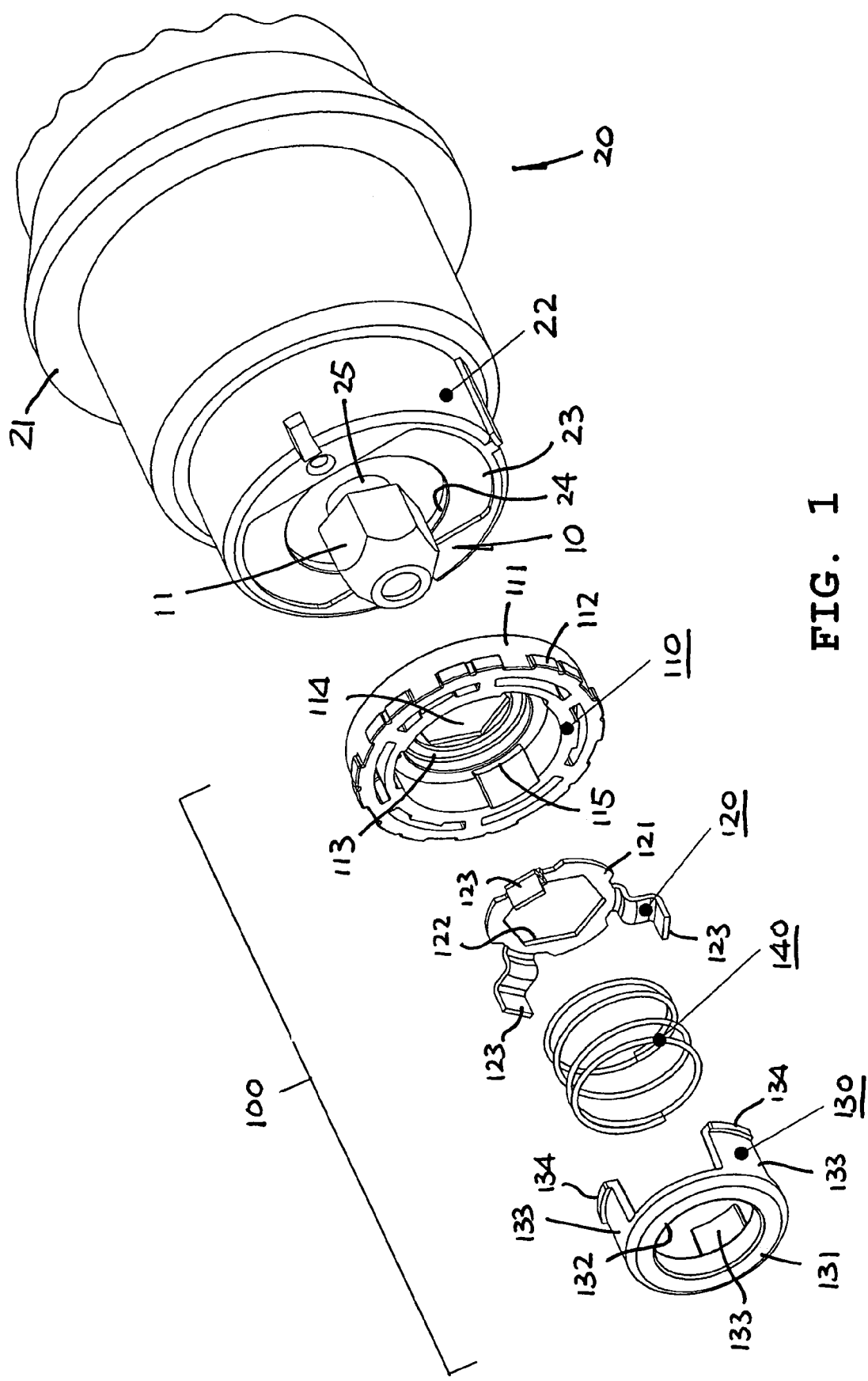
FIG. 1 is a perspective view of an embodiment of a power tool (shown in part) having a tool bit holder with an operator (shown exploded) therefor in accordance with the invention.

Referring to the drawings, there is shown a power tool 20 embodying the invention driven by an electric motor, which tool 20 may be for example a hand-held trimmer for trimming an edge of a workpiece or cutting a groove therein. The power tool 20 has an elongate body 21 and a rotary output shaft 25 protruding from a front end 22 thereof. The front end 22 has an end wall 23 that is formed with a circular central aperture 24 through which the shaft 25 protrudes. A tool bit holder 10 is fixed to the shaft 25 for holding and rotating a trimming/cutting tool bit about an axis of rotation. Also included is an operator 100 for operating, i.e. tightening and/or loosening, the bit holder 10 for mounting/replacing a tool bit.

In this particular embodiment, the tool bit holder 10 is in the form of a collet, that is to say having an inner metal cylindrical socket whose front end is split into separated segments and can be restricted to clutch a tool bit by its shank by turning an outer metal hexagonal nut 11 screwed onto the socket. Bit holders of any other suitable constructions are envisaged, to the extent that they are operated (i.e. opened and closed) through a screwing action.

The operator 100 is an assembly of an annular member in the form of a circular ring or cap 110 that incorporates a rigid insert 120, a mount 130 mounting the cap 110 onto the power tool 20, and a compression coil spring 140 acting between the cap 110 and the mount 130.

The cap 110 has a short cylindrical periphery 111 which bears raised patterns 112 at regular intervals around its outer surface to facilitate gripping by a user for manual turning, and includes a flat wall 113 extending across the periphery 111. The cap wall 113 is formed with a central aperture 114 which has a hexagonal cross-section complementary to that of the collet nut 11 for fitting thereon and hence rotational engagement therewith. The cap 110 includes three equiangular short arcuate slots 115 through the cap wall 113 immediately adjacent the inner surface of the cap periphery 111.

The insert 120 has a disc portion 121 formed with a central aperture 122 that has the same hexagonal shape and size as the cap aperture 114, and three crooked integral arms 123 projecting equiangularly from the disc portion 121. The insert 120 is preferably made of metal. The cap 110 is conveniently moulded onto the insert 120 from plastics material by an insert moulding process, with the disc portion 121 cladding the cap wall 113 on its outer side and the arms 123 fixed within the cap periphery 111. Whilst the two apertures 114 and 122 are in mutual alignment, the insert portion 121 reinforces the cap wall 113.

The mount 130 has a cylindrical can-like plastic body 131 whose end wall is formed with a circular central aperture 132 slightly wider than the collet 10 and whose peripheral wall is hollowed out into three equiangular part-cylindrical legs 133 each having a foot 134 acting as a hook facing outwards. The mount 130 fits co-axially into the cap 110 with its legs 133 extending through the cap slots 115 respectively, such that the cap 110 is slidable axially relative to the mount 130. The spring 140 is held co-axially within the mount 130, acting upon the cap 110.

The assembled operator 100 is disposed co-axially about the collet 10 and shaft 25, with the collet 10 extending in the opposite direction through the cap 110, spring 140 and mount 130. The operator 100 is then pressed upon the front end 22 of the power tool 20 until the mount feet 134 engage with the rim of the tool end aperture 24 through a snap action. As the aperture 24 is circular, the mount 130 and hence overall operator 100 is freely rotatable relative to the power tool 20.

Figure 2:
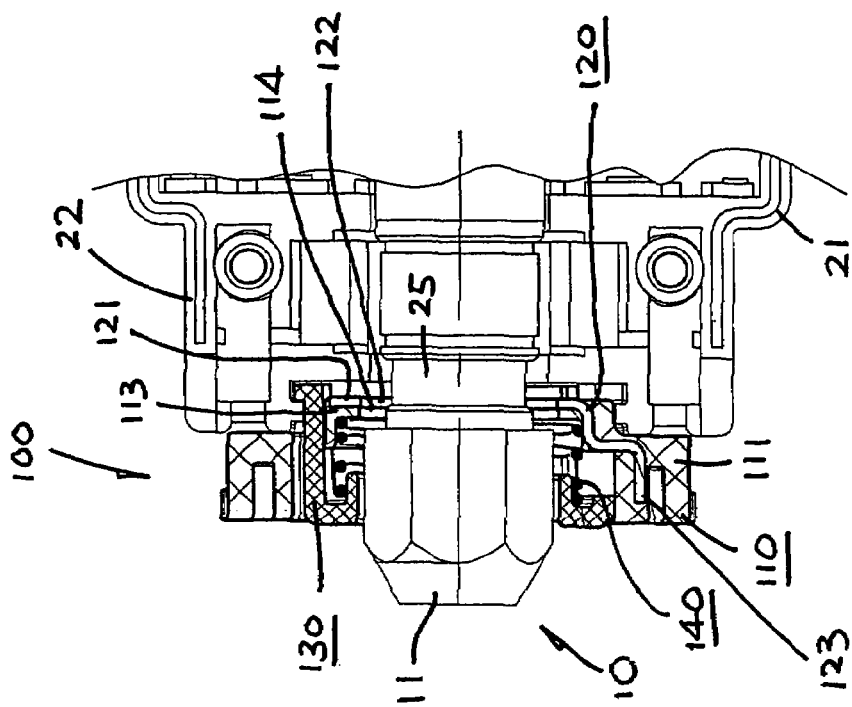
FIG. 2 is a cross-sectional side view of the tool bit holder and operator of FIG. 1, showing the operator in a non-operative position.
Figure 3:
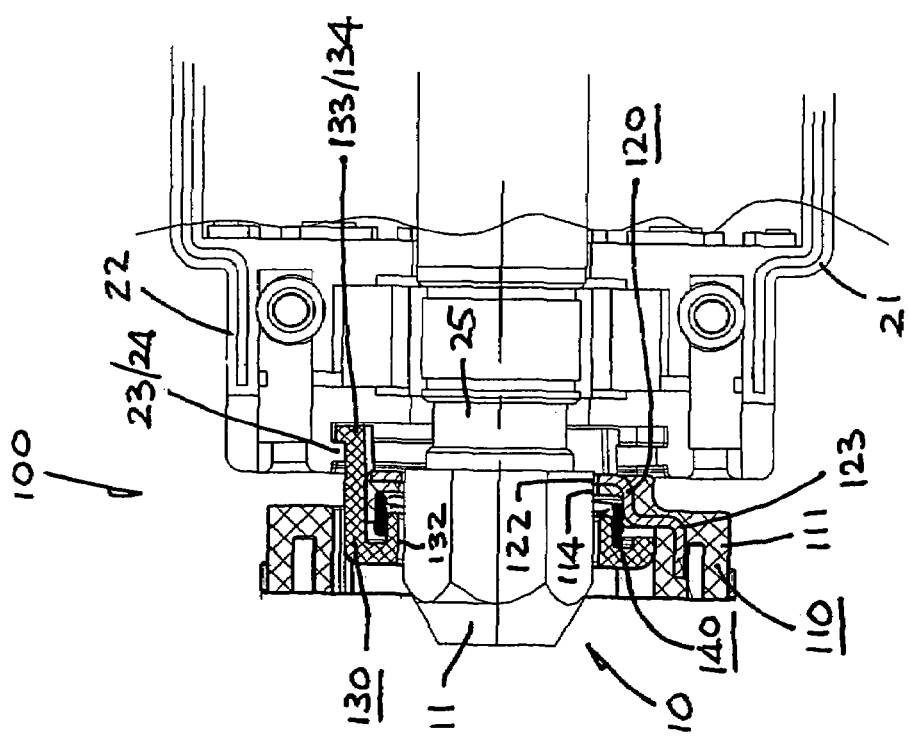
FIG. 3 is a cross-sectional side view equivalent to FIG. 2, showing the operator in an operative position.
Figure 4:
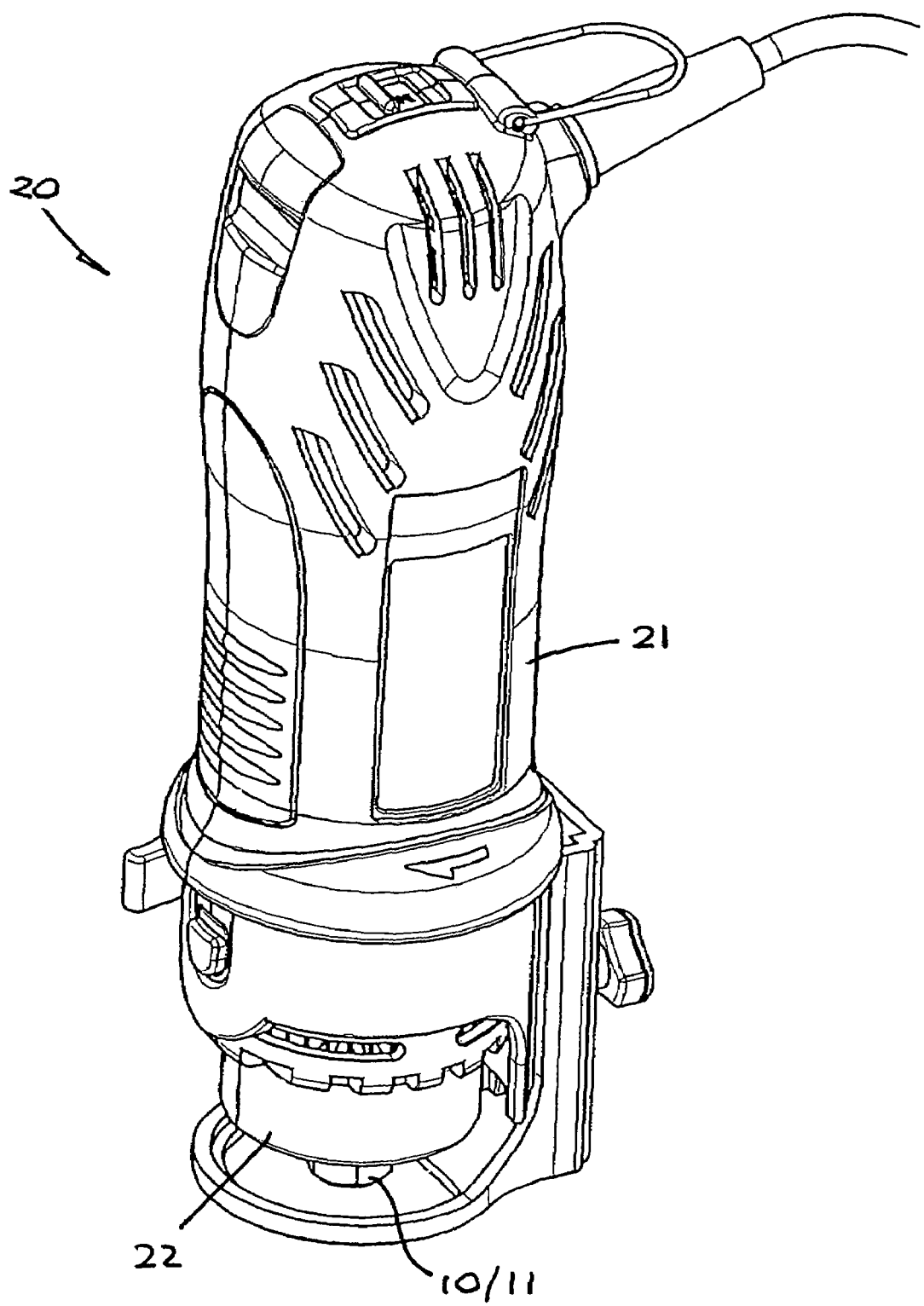
FIG. 4 is a perspective view of the power tool of FIG. 1, shown in whole but without the operator.

Upon being connected to the power tool 20, the mount 130 supports the cap 110 for sliding movement along its legs 133 between a rear non-operative position (FIG. 2) and a front operative position (FIG. 3). In the non-operative position, the cap 110 is rotationally disengaged rearwardly from the collet nut 11 under the action of the spring 140.

Upon manual pulling of the cap 110 to the operative position against the spring 140, it is brought forwards into rotational engagement with the collet nut 11 by its hexagonal insert aperture 122 then surrounding the hexagonal nut 11 (previously the shaft 25). The cap 110 is sufficiently large in diameter for comfortable turning manually to tighten or loosening the collet 10. Upon release, the cap 110 is returned to the non-operative position by the spring 140, whereby the cap 110 is normally inoperative and does not hinder the normal use of the power tool 20.

The operator 100 is a built-in accessory that is always present and immediately available for use whenever needed.

It is envisaged that the spring 140 may be omitted, in which case the cap 110 should have a stable or lockable non-operative position, which may be maintained for example by a spring-loaded detent. The operator 100 is expected to be applicable to power tools other than the hand-held type.

The invention has been given by way of example only, and various other modifications of and/or alterations to the described embodiment may be made by persons skilled in the art without departing from the scope of the invention as specified in the appended claims.

The invention claims is:

1. A power tool having:
   a tool body having a circular element;
   a tool bit holder protruding from the tool body for holding and rotating a tool bit about an axis of rotation; and
   an operator for operating the bit holder, the operator comprising:
      an annular member, rotationally engageable with the bit holder, for manual turning of the bit holder to tighten a tool bit in and loosen a tool bit from the bit holder, and
      a mount mounting the annular member to the tool body for movement of the annular member between a non-operative position rotationally disengaging from the tool bit holder and an operative position rotationally engaging the tool bit holder, wherein the mount has a plurality of legs extending through the annular member that rotatably engage the circular element through a snap action, and
      the annular member is slidable along the mount between the non-operative position and the operative position.

2. The power tool as claimed in claim 1, wherein the operator includes resilient means resiliently biasing the annular member towards the non-operative position.

3. The power tool as claimed in claim 2, wherein the resilient means is located within the mount and resiliently biases the annular member with respect to the mount.

4. The power tool as claimed in claim 1, wherein the mount mounts the annular member to the tool body at a position surrounding the bit holder for movement in opposite directions along the axis of rotation, between the non-operative position and the operative position.

5. The power tool as claimed in claim 1, wherein the annular member has an aperture having a non-circular shape, complementary to the shape of the bit holder, for engagement and rotation of the bit holder.

6. The power tool as claimed in claim 1, including a rigid component mounted on the annular member for engagement and rotation of the bit holder.

7. The power tool as claimed in claim 6, wherein the rigid component is a molded insert of and is located partially within the annular member.

8. The power tool as claimed in claim 6, wherein the rigid component has at least one arm fixed to the annular member.

9. The power tool as claimed in claim 1, wherein the mount is rotatably engaged with the circular element for manual turning of the annular member.

10. The power tool as claimed in claim 1, wherein the tool bit holder comprises a collet.

11. A power tool having:
    a tool body;
    a tool bit holder protruding from the tool body for holding and rotating a tool bit about an axis of rotation; and
    an operator for operating the bit holder, the operator comprising:
       an annular member,
       a rigid component having a non-circular central aperture for engagement and manual rotation of the bit holder to tighten a tool bit in and loosen a tool bit from the tool bit holder, the rigid component including at least one outwardly extending arm engaging the annular member, and
       a mount mounting the annular member to the tool body for movement of the annular member between a non-operative position rotationally disengaged from the tool bit holder and an operative position with the rigid component rotationally engaging the bit holder.

12. The power tool as claimed in claim 11, wherein the operator includes resilient means resiliently biasing the annular member towards the non-operative position.

13. The power tool as claimed in claim 12, wherein the resilient means is located within the mount and resiliently biases the annular member with respect to the mount.

14. The power tool as claimed in claim 11, wherein the mount mounts the annular member to the tool body at a position surrounding the bit holder for movement in opposite directions along the axis of rotation, between the non-operative position and the operative position.

15. The power tool as claimed in claim 11, wherein the annular member has an aperture having a non-circular shape, complementary to the shape of the bit holder, for engagement and rotation of the bit holder.

16. The power tool as claimed in claim 11, wherein the rigid component is a molded insert of and is located partially within the annular member.

17. The power tool as claimed in claim 11, wherein the mount extends through the annular member and is connected to the tool body so that the annular member is slidable along the mount between the non-operative position and the operative position.

18. The power tool as claimed in claim 17, wherein the tool body includes a circular element, and the mount has a plurality of legs that extend through the annular member and rotatably engage the circular element through a snap action.

19. The power tool as claimed in claim 11, wherein the tool body has a circular element, and the mount rotatably engages the circular element for manual turning of the annular member.

20. The power tool as claimed in claim 13, wherein the tool bit holder comprises a collet.

* * * * *